April 26, 1955
J. J. KALEBA ET AL
2,707,214
PEDAL SWITCH MECHANISM
Filed Sept. 10, 1952
2 Sheets-Sheet 1
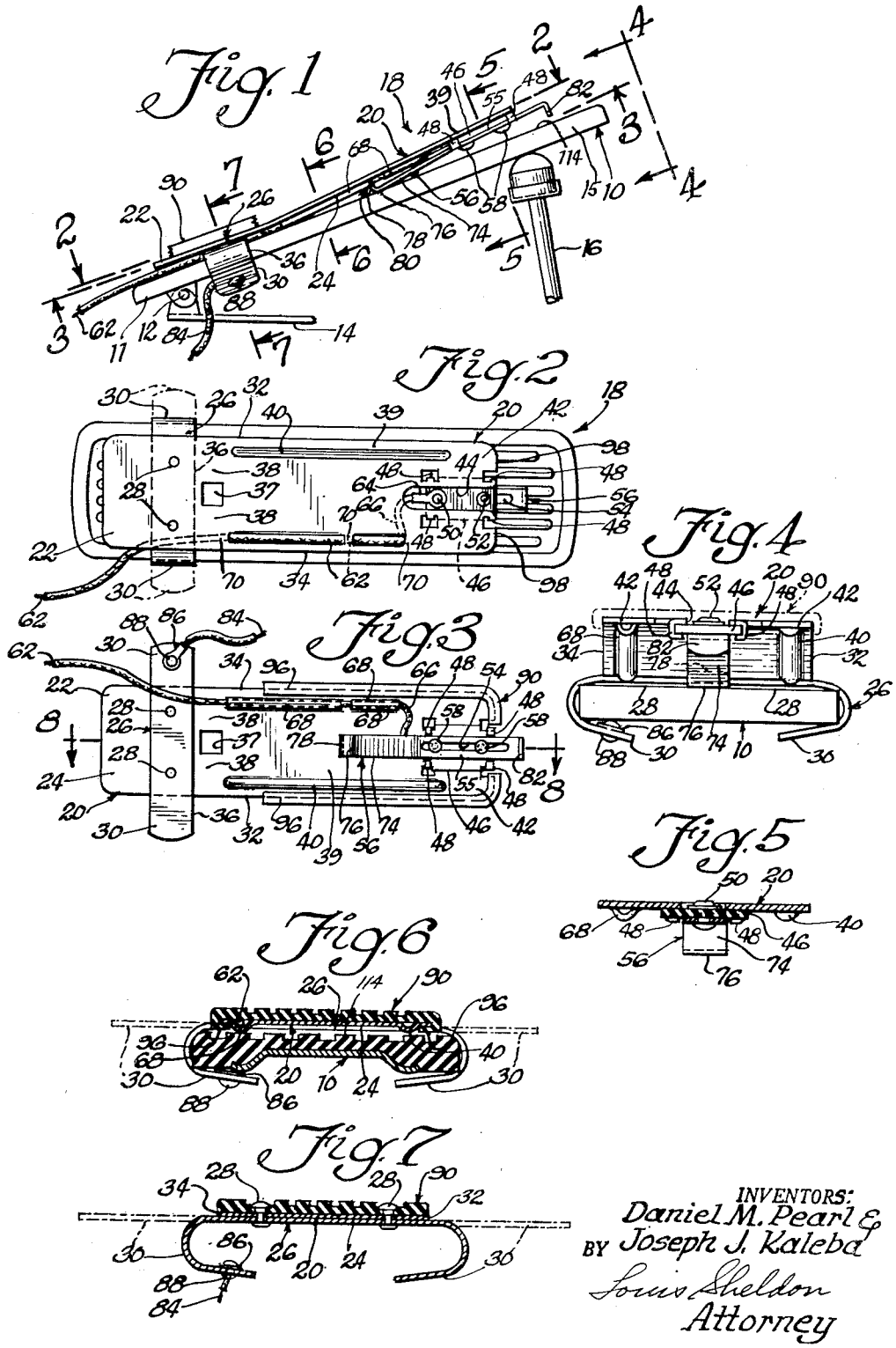
INVENTORS:
Daniel M. Pearl &
BY Joseph J. Kaleba
Louis Sheldon
Attorney

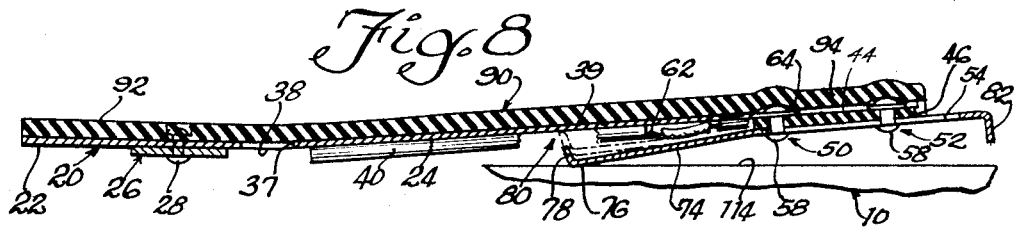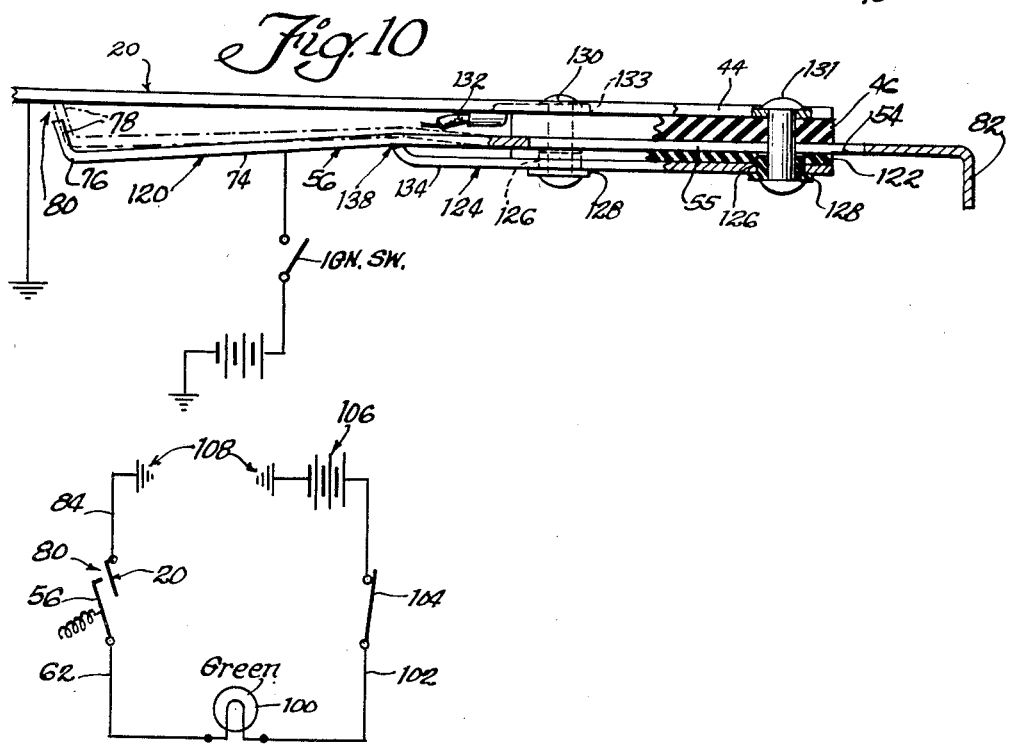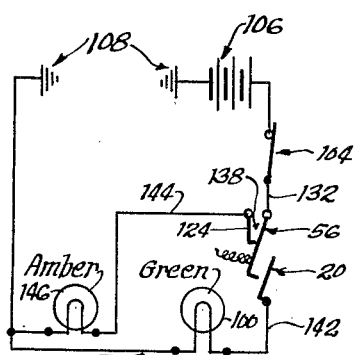

United States Patent Office 2,707,214
Patented Apr. 26, 1955

2,707,214

PEDAL SWITCH MECHANISM

Joseph J. Kaleba, Roselle, and Daniel M. Pearl, Chicago, Ill., assignors to Darwin Products, Inc., Chicago, Ill., a corporation of Illinois Application September 10, 1952, Serial No. 308,814

9 Claims. (Cl. 200—61.89)

This invention relates to electric switch mechanisms and is concerned more particularly with pedal switch mechanisms.

It is an object of the invention to provide a pedal assembly including a switch for controlling a signal to indicate whether or not the mechanism controlled by the pedal is or is not being actuated.

A further object is to provide an accelerator pedal assembly including a switch controlling a signal to indicate whether or not an automobile or other vehicle is or is not being accelerated pursuant to action of the operator.

It is also an object to provide a switch mechanism of the character referred to which is adjustable to compensate for the pressure of the driver's foot resting on the accelerator pedal while the engine is idling, so as to prevent such pressure from closing the switch.

Another object is to provide a switch of the character referred to adapted to be manually, easily and speedily mounted on an accelerator pedal in proper position by an unskilled person.

A further object is to provide a switch adapted to be mounted on an accelerator pedal so as to close when the pedal is depressed, to signal that fact to a following driver, the switch being adapted to transmit the pressure from the driver's foot to the pedal.

It is also an object to provide a switch adapted to be mounted on an accelerator pedal so as to receive the driver's foot pressure and be closed in one position as long as the pressure is maintained and be closed in another position when the pressure is relaxed, to control respectively a go signal and a caution signal.

Further objects and advantages of the invention will appear as the description proceeds.

The invention will be better understood upon reference to the following description and accompanying drawing, in which:

Fig. 1 is a side elevational view of one form of switch unit assembled with an accelerator pedal, the switch unit pad being omitted.

Fig. 2 is a top plan view of the same, taken as indicated by the line 2—2 in Fig. 1.

Fig. 3 is a bottom plan view of the unit, taken as indicated by the line 3—3 in Fig. 1.

Fig. 4 is an enlarged front end elevational view taken as indicated by the line 4—4 in Fig. 1.

Figs. 5, 6 and 7 are enlarged sectional views taken as indicated by the lines 5—5, 6—6, and 7—7, respectively, in Fig. 1.

Fig. 8 is an enlarged longitudinal sectional view of the assembly appearing in Fig. 1.

Fig. 9 is an electric circuit diagram including the form of switch unit shown in Figs. 1 to 8.

Fig. 10 is a longitudinal view, partly in section, of a modified switch unit.

Fig. 11 is an electric circuit diagram including the form of switch unit shown in Fig. 10.

Referring now more particularly to the drawing, disclosing illustrative embodiments of the invention, there is shown at 10 an accelerator or gas pedal hinged as at the rear end 11 thereof as at 12 to a bracket 14 stationary on the floor of an automobile or the like. The pedal 10 rests at its forward end 15 on an element 16 forming part of the linkage (not shown) extending to the throttle valve of an engine such as a motor vehicle engine, all as is well known in the art.

In accordance with an illustrative embodiment of the invention, there is provided a unit 18 comprising an elongated metal plate 20 which may be of sheet metal, adjacent one end 22 and preferably at the bottom 24 of which a metal strap 26 is riveted as at 28, the ends 30 of the strap being manually bendable and extending substantially beyond the side edges 32 and 34 of the plate. The plate 20 adjacent the forward edge 36 of the strap 26 may be formed with a hole 37 affording a weakened region 38 enabling the portion 39 of the plate in advance of said region to resiliently flex bodily about said region as an axis, said plate portion preferably having a longitudinal stiffening rib 40.

The forward end 42 of the plate 20 is formed with a longitudinal slot 44 (Fig. 2), and a preferably stiff contact insulator piece 46 extends across the slot and is securely held in place at the bottom 24 of the plate as by clinching tongues 48. The shanks of two longitudinally alined and spaced rivets 50 and 52 pass through the insulator 46 and through the longitudinal slot 54 formed in the forward portion 55 of a metal spring strip 56 serving in one form of the invention as a slider contact, said strip being confined between the bottom of the insulator and the bottom heads 58 of the rivets and being thereby frictionally held in any position to which it is manually adjusted.

An insulated wire 62 is mounted on the insulator 46 by means of its terminal 64 and the top head of the rear rivet 50, the wire insulation extending against the bottom 24 of the plate 20 and through spaced alined tunnels 68 formed in the plate and being retained in the tunnels by the intervening and end plate portions 70. The strip 56 has a downwardly and rearwardly extending rear lever arm 74 bent as at 76 near its free end and having an upwardly projecting end contact tip 78 below and facing the bottom 24 of the plate 20 and forming with said plate a switch 80. The strip 56 has a forward and preferably downwardly bent end portion or finger grip tab 82 to enable the installer to slide the strip into proper adjustment, as will appear. An insulated grounding wire 84 is preferably secured by its terminal 86 and a rivet 88 to an end portion 30 of the strap 26.

A rubber or other suitable pad 90 is provided to overlie and protect the plate 20 and associated parts, the rear portion 92 of the pad being fastened to the plate as by the rivets 28, and the forward portion 94 of the pad being releasably held in place by means of downwardly and inwardly arranged marginal lips 96 receiving the forward marginal side edges 32 and 34 of the plate and the forward laterally spaced front continuations 98 of said edges. Thus the forward portion 94 of the pad 90 may be manually applied pursuant to manipulation of the lips 96 and thereby retained in assembly with the forward portion 39 of the plate 20.

A circuit adapted to include the switch 80 is shown diagrammatically in Fig. 9, in which a light 100, which may be a green light to conform to conventional traffic light practice and is preferably adapted to be mounted on the vehicle so as to be visible to a following driver, is connected by a conductor 102 to the ignition switch 104 and thence to the battery 106, such as a motor vehicle battery, grounded at 108, and by the wire 62 to the strip 56, and the plate 20 is connected by the wire 84 to ground.

In applying the unit 18 to the accelerator or gas pedal 10, the installer places the unit, pad 90 uppermost, on the pedal and bends the strap ends 30 downward and then toward each other so as to tightly clasp the rear end portion 11 of the pedal, with the bend 76 of the strip 56 in engagement with the top 114 of the pedal, the forward portion 39 of the plate, by reason of the presence of the contact tip 78 between the plate and the top of the pedal, being thereby flexed upward about the weakened region 38 as shown. The pedal top 114 is part of a rubber pad or the like which is conventionally part of the accelerator pedal and thus insulates the contact tip 78. The installer then makes all of the necessary electrical connections as noted above, and, with the light 100 temporarily where he can see it, and while seated in the driver's seat, he depresses the forward portion of the pad 90 with his foot in the natural way as he operates the car, causing the forward portion 39 of the plate 20 to flex downward about the weakened region 38 and overcoming the spring resistance of the slider arm 74, until the plate 20 engages the contact tip 78, thereby closing the switch 80 so that the light 100 glows.

If the driver is one who habitually rests his foot on the accelerator pedal when the engine is idling, any danger of thus prematurely closing the switch 80 may be readily obviated by the simple expedient of adjusting the contact strip 56 forward so as to locate the fulcrum of the arm 74 closer to the free end 76 of said arm, thereby increasing the pressure, needed to flex the arm sufficiently to close the switch, to a degree exceeding such idling foot pressure. Such forward adjustment in such event should manifestly be greater for a driver having a "heavy foot" than for a driver having a "light foot." It will be noted that the spring bias of the arm 74 varies inversely with its effective length, and said length decreases as the strip 56 is adjusted forward. Each adjustment is made to suit the particular driver involved, and is made by trial and error so that the light 100 will not glow until acceleration actually commences. This takes but a moment or two, and, once the strip 56 is in the desired adjustment, it will be held therein by reason of the friction between it and the insulator 46 and the rivets 50 and 52. The installer then mounts the light 100 on the vehicle in a position to be observed by following drivers, and thus the installation is complete.

It will be observed that the forward projecting portion of the contact strip 56 is substantially below the pad 90 and is so located that the strip cannot be accidentally moved by the driver's foot applied to the pad 90. Should the strip 56 accidentally be moved to an improper position, i. e., such as to effect premature closing of the switch 80, the strip may be readily readjusted by hand as is apparent from the foregoing.

The entire unit 18 including the plate 20 and parts carried thereby may be removed from the gas pedal 10 pursuant to manual reverse bending of the strap ends 30.

The arrangement shown and described is manifestly very simple in construction and thus may be manufactured at low cost, and may be readily installed and adjusted by the driver following the simplest instructions without the use of tools.

In the form of the invention just described, the switch is a special form of the single-pole single-throw type, adapted in the on position to energize the green light 100 and in its off position to de-energize the light.

In accordance with another form of the invention, as shown in Figs. 10 and 11, provision is made for the energization of a caution light when the aforesaid off position obtains, i. e., when the acceleration pressure is released, and accordingly a special single-pole double-throw switch unit 120 is provided. The switch unit 120 differs from the single-pole single-throw switch unit 18 above described in that an additional insulator piece 122 is placed under the slotted portion 55 of the strip 56, a metal contact strip 124 formed with holes 126 is placed under the insulator piece 122, flanged insulation washers 128 are placed in the holes and in register with the rivet holes in the insulation piece 46, and the rivets 50 and 52 are replaced by longer rivets 130 and 131 serving to frictionally hold the strip 56 in any selected adjusted position, a wire 132 being secured by means of its terminal 133 to the rivet 130. Accordingly the fulcrum about which the arm 74 of the strip 56 is adapted to flex is located at the rear juncture of said strip with the insulation pieces 46 and 122, and the contact strip 124 has a rearwardly extending portion 134, which is engaged with the strip 56 to close a switch 138 when the switch pole or arm 74 is relaxed out of engagement with the plate 20, and is disengaged from said pole when the latter is engaged with the plate.

An electric signal light circuit arrangement adapted to include the switch unit 120 is shown in Fig. 11. In this circuit arrangement, the conductor 132 replaces the wire 62 and connects the strip 56 to the ignition switch 104, the plate 20 is connected by a conductor 142 with the grounded green light 100, and the contact strip 124 is connected by a conductor 144 to an amber light 146 which may be directly or indirectly grounded. It should now be apparent that when the accelerator pedal is released the green light 100 is dark and the amber light 146 glows, and when acceleration commences pursuant to depression of the pedal 10 the green light glows and the amber light is dark.

In the forms of the invention above considered, provision is made for adjustment of the contact strip member 56 to adapt the devices to "heavy-footed" and "light-footed" drivers. This provision may be eliminated by so tightly securing the rivets 50, 52 and 130, 132 as to render the contact member 56 incapable of adjustment. The constructions in such event are the same as are shown, the contact strip 56 being first positioned so that it will not prematurely engage the plate 20 and then fixedly riveted in place, and that is the condition in which the devices are purchased. The switch unit is then installed by the simple expedient of bending the strap arms 30 down and under the accelerator pedal 10 as aforesaid without further ado, other than connecting the wiring and mounting the light or lights.

Various modifications coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

We claim:

1. In an accelerator pedal switch mechanism for a motor vehicle, an accelerator pedal having an insulating tread pad and mounted in operative position in the vehicle, a support member overlying said pedal and having a switch contact facing said pedal, means connecting the rear end of said member to said pedal, the remainder of said member being movable toward and away from said pedal, a slider mounted on and manually shiftable longitudinally of said member and frictionally held in adjusted position, said slider having a spring extension between said pedal pad and said member, a contact tip carried by said slider extension and insulated from said member and disposed below said contact, whereby, when said member is depressed by the driver's foot, said contact is adapted to engage said contact tip, said slider being adjustable to enable said engagement to take place pursuant to pressure of the driver's foot substantially at the same time that the pedal commences to open the throttle above idle setting.

2. In an accelerator pedal switch mechanism, an elongated sheet metal plate of a size and shape to overlie an accelerator pedal and having laterally extending ears at the rear end portion thereof, said ears being readily manually bendable to engage under the sides of the pedal whereby said plate may be clinched to the pedal, said plate having a relatively weak intermediate region, the portion of said plate forward of said region being a substantially stiff arm swingable resiliently about said region, an elongated metal strip mounted on and insulated from and manually slidable along said plate and frictionally held in adjusted position, said strip having an extension resiliently flexible toward and away from said plate and disposed below and resiliently biased away from said plate, whereby, when said plate is installed on an accelerator pedal and the forward portion of said plate is depressed by the driver's foot, the forward portion of said plate is adapted to engage said extension when the engine commences to accelerate.

3. A switch mechanism, comprising a sheet metal plate, a sheet metal strap extending across and beyond opposite margins of and secured to said plate, a rubber or the like pad overlying and mounted on said plate, the end portions of said strap being manually bendable to enable said plate to be manually clinched to the tread of a vehicle accelerator pedal, said plate having a weakened intermediate region about which an end portion of said plate is resiliently flexible, said end portion of said plate having a marginal pair of alined trench-like indentations open at their ends for the reception of an insulated wire, said plate at the ends of said indentations having coplanar portions for retaining the wire in said indentations, said plate having in said other end portion an elongated slot extending toward said strap, an insulation piece bridging said slot and clinched to said plate, a pair of longitudinally spaced rivets passing through said piece adjacent said slot and spaced from said plate, a wire having a terminal engaging and secured by a rivet head disposed at a face of said piece adjacent said plate, said terminal being spaced from said plate, said wire being insulated and extending in said indentations, a sheet metal spring strip extending longitudinally of said slot and having a longitudinal slot through which said rivets extend, the rivet heads at the other face of said piece engaging said strip and retaining said strip in assembly with said piece, said strip slot being substantially longer than the distance between said rivets and said strip being frictionally engaged by said piece and the adjacent rivet heads so as to be adjustable longitudinally of said plate, said strip having a cantilever extension with a contact tip normally spaced from said plate and constituting with said end portion of said plate a switch, said tip being engageable with said end portion of said plate to close said switch pursuant to downward pressure on said pad and plate by the driver's foot when said plate is mounted on an accelerator pedal.

4. In an electric circuit including go and caution signal lights adapted to be mounted on an automobile for selectively indicating that the accelerator pedal is depressed and released, respectively, a single pole double throw control switch mechanism for said lights, said mechanism comprising a member adapted to overlie an accelerator pedal, means enabling said member to be flexibly connected to the pedal so that said member may move up and down over the pedal, said member having a switch contact adapted to be wired to the go light, a pole adapted to be wired to the automobile battery, said pole being supported by and disposed below said member and facing and insulated from said contact, said pole being disposed adjacent the top of the pedal when said member is connected to the pedal as aforesaid, a second contact adapted to be wired to the caution light, said second contact being supported by said member and insulated from the first contact and from and disposed below said pole, said pole being resiliently biased away from said first contact and into engagement with said second contact, whereby, when the driver applies foot pressure on said member for accelerating the automobile, said pole will separate from said second contact and engage said first contact as acceleration commences, said biasing means being operative, pursuant to full release of the pressure, to separate said pole from said first contact and effect engagement of said pole with said second contact.

5. In an apparatus including an electric circuit embodying go and caution signal lights for an automobile to selectively indicate whether the automobile accelerator pedal is depressed or released, a control mechanism for the lights, said control mechanism comprising a member formed to overlie the pedal, means for movably mounting said member on the pedal so that said member may move up and down over the pedal, said member comprising a switch contact adapted to be wired to the go light, a second contact supported by said member and insulated from the first contact and adapted to be wired to the caution light, a metal spring arm adapted to be wired to the automobile battery, said arm being supported by said member and extending below and normally biased out of engagement with said first contact, said arm extending above and normally biased into engagement with said second contact, said arm being otherwise insulated from said contacts and being adapted to be disposed adjacent the top of the pedal when said member is connected to the pedal as aforesaid to receive the pressure of the driver's foot for acceleration of the automobile, whereby, in the absence of acceleration pressure, said arm is engaged with only said second contact, so as to energize only the caution light, and, upon the application of acceleration pressure, said arm is engaged only with said first contact, so as to energize only the go light.

6. In a switching unit for selectively energizing go and caution lights for an automobile, a member adapted to overlie the automobile accelerator pedal, said member comprising an upper switch contact, a lower switch contact, and an intermediate switch arm selectively engageable with said contacts, said arm comprising a resilient strap normally biased downward into engagement with said lower contact and away from said upper contact, said upper contact being resiliently biased upward away from said arm, and means for attaching said member to the accelerator pedal with said arm disposed adjacent the top of the pedal, whereby, when said upper contact is flexed downward pursuant to downward pressure of the driver's foot, said arm, by reason of its engagement with the pedal, is flexed out of engagement with said lower contact and into engagement with said upper contact, and the pedal, pursuant to such engagement, is depressed, and when the foot pressure is relaxed, said upper contact and arm will be automatically disengaged and said arm will re-engage said lower contact.

7. In a switching mechanism adapted to control a go light and to cooperate with an automobile accelerator pedal to indicate to following drivers whether or not pedal is depressed, a sheet metal plate switch contact having attaching means at the rear thereof for attaching said plate to the rear of an automobile accelerator pedal with said plate arranged over the pedal, said plate having a weakened intermediate region about which the forward portion of said plate is resiliently flexible, a metal spring strip switch contact extending below and confronting said forward portion and arranged to substantially engage the top of the pedal when said plate is attached as aforesaid, said strip being insulated from and supported by and biased away from said forward portion, whereby pressure of the driver's foot on said forward portion, for the purpose of depressing the pedal, will flex said forward portion downward and at the same time flex said strip contact and effect engagement between said contacts, said pressure being communicated by said strip contact to the accelerator pedal to depress the same.

8. In a motor vehicle in which the accelerator pedal must be depressed to a predetermined extent to take up idling slack before the vehicle can be propelled, so that the vehicle will not be propelled when the driver lightly rests his foot on and thus lightly depresses or "rides" the pedal awaiting an opportunity to commence propulsion of the vehicle: a signal switch mechanism for energizing a light to indicate that the vehicle is being propelled, said mechanism comprising a member having means for supporting the same from the pedal, said member comprising a contact arranged to confront the pedal, means biasing said contact away from the pedal, a second contact carried by said member and insulated from the first contact and arranged to be disposed between said first contact and the pedal, and means biasing said second contact away from said first contact, whereby pressure of the driver's foot toward the pedal will depress said first contact toward the pedal and said second contact will be restrained by the pedal, the parts being so constructed and arranged that said contacts will interengage only upon the exertion of foot pressure in excess of that necessary to take up the idling slack.

9. In a switching mechanism adapted to control a go light and to cooperate with an automobile accelerator pedal to indicate to following drivers whether or not the automobile is being propelled, a switch contact having means for attaching the same to an automobile accelerator pedal with a portion of said contact confronting the pedal tread, said contact portion being connected to the remainder of said contact by a weakened region about which said portion is resiliently flexible, and a spring contact arranged to extend between said portion and the pedal and to substantially engage the pedal when the first contact is attached as aforesaid, said spring contact being insulated from and supported by said first contact and self-biased away from said portion, whereby pressure of the driver's foot communicated to said portion, for the purpose of depressing the pedal, will flex said portion toward the pedal and at substantially the same time flex said spring contact and effect mutual approach of said contacts, said pressure being communicated by said spring contact to the accelerator pedal to depress the same.

References Cited in the file of this patent

UNITED STATES PATENTS

| | | |
|---|---|---|
| 1,492,546 | Miller | Apr. 29, 1924 |
| 2,232,447 | Griffith | Feb. 18, 1941 |
| 2,435,389 | Good | Feb. 3, 1948 |

FOREIGN PATENTS

| | | |
|---|---|---|
| 174,384 | Great Britain | Feb. 2, 1922 |